United States Patent [19]

Yamamoto et al.

[11] Patent Number: 5,025,067
[45] Date of Patent: Jun. 18, 1991

[54] PARTIALLY CURED EPOXY RESINS AND ELECTROSTATOGRAPHIC TONER CONTAINING THE SAME AS BINDER

[75] Inventors: Yohzoh Yamamoto; Goro Suzuki; Hideo Nakamura; Kiyomi Yasuda, all of Chiba, Japan

[73] Assignee: Mitsui Petrochemical Industries, Ltd., Tokyo, Japan

[21] Appl. No.: 271,815

[22] Filed: Nov. 16, 1988

[30] Foreign Application Priority Data

Nov. 19, 1987 [JP] Japan .................................. 62-292841
Nov. 20, 1987 [JP] Japan .................................. 62-294795
Dec. 28, 1987 [JP] Japan .................................. 62-333663

[51] Int. Cl.$^5$ ................. C08L 63/02; C08G 59/14; C08G 59/68
[52] U.S. Cl. .................................. 525/109; 525/113; 525/114; 525/116; 525/117; 525/118; 525/119; 525/120; 525/122; 525/481; 528/98; 528/99; 528/100; 528/102; 528/104; 528/112; 528/113; 528/114; 528/115; 528/118; 528/119; 528/120; 528/121; 528/122; 528/123; 528/124; 528/327; 528/367; 528/407; 430/109; 430/137; 430/280; 430/965
[58] Field of Search ............... 525/109, 113, 114, 119, 525/122, 120, 481; 528/98–100, 102, 104, 112–115, 118, 119, 120, 121, 122–124, 327, 365, 407; 430/109, 137, 280, 965

[56] References Cited

U.S. PATENT DOCUMENTS

| | | | |
|---|---|---|---|
| 4,215,210 | 7/1980 | Okayama et al. | 528/87 |
| 4,288,565 | 9/1981 | Lohse et al. | 525/481 |
| 4,465,542 | 8/1984 | Furihata | 525/113 |
| 4,486,559 | 12/1984 | Murata et al. | 523/468 |
| 4,575,478 | 3/1986 | Ohno | 430/109 |
| 4,588,617 | 5/1986 | Oka | 528/88 |

FOREIGN PATENT DOCUMENTS 0127375  5/1984  European Pat. Off. .

OTHER PUBLICATIONS

Patent Abstracts of Japan, vol. 6, No. 252 (P-161)(1130), Dec. 10, 1982.

Primary Examiner—Earl Nielsen
Assistant Examiner—Frederick Krass
Attorney, Agent, or Firm—Nixon & Vanderhye

[57] ABSTRACT

An epoxy resin comprising an active hydrogen compound having at least three active hydrogen atoms capable of reacting with an epoxy group in its molecule or butadine or isoprene as a main monomer is modified with an oligomer having on average at least 1.5 equivalents of active hydrogen capable of reacting with an epoxy group in its molecule. An epoxy resin modified with a bisphenol and a compound having active hydrogen or acid anhydride groups capable of reacting with an epoxy group is also provided. A toner containing the epoxy resin as a binder is useful in electrostatography.

2 Claims, No Drawings

PARTIALLY CURED EPOXY RESINS AND ELECTROSTATOGRAPHIC TONER CONTAINING THE SAME AS BINDER

BACKGROUND OF THE INVENTION

This invention relates to novel epoxy resins and electrostatographic toner containing the same as a binder.

Known developers used in electrostatography are generally classified into one component and two component types. The two component type developer is a mixture of a toner or colored powder and a carrier or chargeable particles. The toner contains a coloring agent such as a pigment and dye, a resinous binder, a lubricant, and other additives.

In electrostatography, toner is fixed onto a substrate, for example, a sheet of paper by three typical methods, a pressure fixing method of passing between two or more metallic rolls to fix the toner to the paper under mechanical pressure, a thermal fixing method of heating the toner to above the melting point thereof to fuse the toner to the paper, and a heat roll fixing method which is a combination of the foregoing two methods.

The heat roll fixing method is improved in fast copying, but suffers from so-called offset that part of the toner adheres and transfers to the heat roll surface because the toner in a molten state is brought in contact with the heat roll. The molten state of the toner causing offset largely depends on the melting point of a binder resin in the toner.

Various resins were proposed in the prior art as the binder resin, including polyethylene, styrene-acryl copolymers, polyesters, and epoxy resins. Styrene resin has been widely utilized among them because it incurs little offset and thus has satisfactory high-temperature fixing properties.

Electrostatography has spread the area of application in these years, stepping out to household appliances. Such application requires a reduction of power consumption. Particularly in color copying, the fixing temperature of toner should be lowered to fix the toner to the whole surface of a sheet. When an electrostatographic equipment is used as a high-speed printing terminal for a computer or the like, high speed fixing is required.

In consideration of a reduction of the power consumed by a heat roll and high-speed copying, the toner and hence, the binder resin is desired to have a lower melting point. A toner having improved fixing properties at low temperatures is available with the use of an epoxy resin as the binder resin because the epoxy resin has a lower melting point than the styrene resin.

The styrene resin has another drawback. Unfortunately styrene is soluble in plasticizers for polyvinyl chloride such as dioctyl phthalate. If a copy is stored in contact with a flexible polyvinyl chloride film, the toner on the copy transfers and adheres to the film to stain the film. The epoxy resin is free from such a phenomenon.

The epoxy resin, however, tends to incur offset because it has a low molecular weight and a low melt viscosity. Particularly, in the case of commonly used bisphenol and hydrogenated bisphenol type epoxy resins, those resins having a lower melting point and hence, a lower molecular weight have an increased tendency to incur offset.

SUMMARY OF THE INVENTION

An object of the present invention is to provide an epoxy resin which is readily crushable, and has improved fixing properties at low temperatures and fast fixing properties and is free of offset when used as an electrostatographic toner.

Another object of the present invention is to provide a toner for use in electrostatic image development.

According to a first aspect of the present invention, there is provided a toner for use in electrostatographic development, comprising as a binder an epoxy resin which is prepared by reacting (a) at least one epoxy resin selected from the class consisting of bisphenol type and hydrogenated bisphenol type epoxy resins, with (b) an active hydrogen compound having at least three active hydrogen atoms capable of reacting with an epoxy group in its molecule, in such a proportion that about 0.05 to about 0.35 equivalents of active hydrogen are present per equivalent of the epoxy group in component (a).

According to a second aspect of the present invention, there is provided a toner for use in electrostatographic development, comprising as a binder an epoxy resin copolymer which contains (a) 100 parts by weight of at least one epoxy resin selected from the class consisting of bisphenol type and hydrogenated bisphenol type epoxy resins, and (c) about 5 to 40 parts by weight of an oligomer based on at least one main monomer selected from the class consisting of butadiene and isoprene, said oligomer having on average at least 1.5 equivalents of active hydrogen capable of reacting with an epoxy group in its molecule, and has a softening point of 60 to 130° C as measured by Durran's method.

According to a third aspect of the present invention, there is provided a toner for use in electrostatographic development, comprising as a binder an epoxy resin which is prepared by reacting (a) 100 parts by weight of at least one epoxy resin selected from the class consisting of bisphenol type and hydrogenated bisphenol type epoxy resins, (d) a bisphenol, (e) at least one member selected from the class consisting of active hydrogen compounds and acid anhydrides having at least 3 equivalents of active hydrogen or acid anhydride group capable of reacting with an epoxy group in the molecule, and (f) about 2 to about 30 parts by weight of an oligomer based on at least one main monomer selected from the class consisting of butadiene and isoprene, said oligomer having on average at least 1.5 equivalents of active hydrogen and/or acid anhydride group capable of reacting with an epoxy group in its molecule, the amounts of components (d) and (e) being defined by the equations:

$$400 \leq \frac{W(a) + W(d)}{W(a)/EqO(a) - W(d)/EqOH(d)} \leq 900 \quad (1)$$

and $$\alpha \geq \frac{\gamma \rho}{1 - \gamma(1 - \rho)} \quad (2)$$

wherein $$\alpha = \frac{1}{N(e) - 1}$$

$$\gamma = \frac{N(d) + N(e)}{N(a)}$$

$$\rho = \frac{N(e)}{N(d) + N(e)}, \text{ and}$$

wherein

W(a) and W(d) are the weight of components (a) and (d) respectively,

EqO(a) is an epoxy equivalent of component (a), and EqOH(d) is an OH equivalent of component (d).

N(a), N(d), and N(e) are the average functionality per molecule of components (a), (d), and (e), respectively.

The present invention also provides modified epoxy resins for use in the above-mentioned electrostatic image development toners.

DETAILED DESCRIPTION OF THE INVENTION

The organization of the present invention will be described in detail.

First, the epoxy resin prepared from the reaction of components (a) and (b) according to the first aspect of the present invention is described as well as a toner using the same.

Component (a) is bisphenol type epoxy resins and hydrogenated bisphenol type epoxy resins. They are generally represented by the following formula.

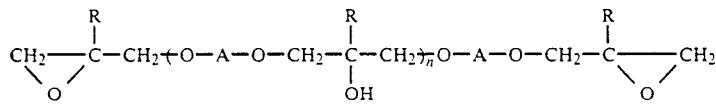

In the formula, A is a divalent residue of a bisphenol or hydrogenated bisphenol of the formula: HO-A-OH, R is hydrogen or a methyl group, and n is the number of recurring units.

Typical examples of the bisphenol type and hydrogenated bisphenol type epoxy resins are glycidyl ethers and β-methylglycidyl ethers which are prepared from bisphenols as illustrated below or hydrogenated bisphenols derived therefrom and epihalohydrins or β-methylepihalohydrins.

Examples of the bisphenols used herein include 2,2-bis(4-hydroxyphenyl)propane (commonly referred to as bisphenol-A), bis(4-hydroxyphenyl)methane (commonly referred to as bisphenol-F), 1,1-bis(4-hydroxyphenyl)ethane (commonly referred to as bisphenol-AD), 1,1-bis(4-hydroxyphenyl)cyclohexane, 1,1-bis(4-hydroxyphenyl)-1-phenylethane, bis(4-hydroxyphenyl)sulfone, bis(4-hydroxyphenyl)ether, and halides thereof.

Preferred among other are glycidyl ethers of bisphenol-A (bisphenol-A type epoxy resins) and glycidyl ethers of bisphenol-F (bisphenol-F type epoxy resins).

The epoxy resin as component (a) preferably has an epoxy equivalent of about 150 to 1,000, more preferably about 160 to about 700.

These bisphenol type and hydrogenated bisphenol type epoxy resins may be used alone or in admixture of two or more.

Component (b) is an active hydrogen compound having at least three active hydrogen atoms capable of reacting with an epoxy group in its molecule. The active hydrogen atoms are those of amino, carboxyl and phenolic hydroxyl groups, for example. Examples of the active hydrogen compound include polyfunctional amines such as N-aminoethylpiperazine, diethylenetriamine, triethylenetetramine, trimethylhexamethylenediamine, isophoronediamine, meta-xylylenediamine, meta-phenylenediamine, and diaminodiphenylmethane, polyamides such as condensates of polybasic acids with polyamines, and organic acid dihydrazides, polyfunctional carboxylic acids such as tricarballylic acid, aconitic acid, camphoronic acid, trimellitic acid, and pyromellitic acid, aminocarboxylic acids such as glycine, alanine, aminolactic acid, leucine, cystine, lysine, aspartic acid, and aminobenzoic acid, iminocarboxylic acids such as diglycollamidic acid, triglycollamidic acid, and ethylenediaminetetraacetic acid, polyhydric phenols such as pyrogallol, fluoroglycine, phenolic novolak, cresol novolak, and octylphenol novolak, aminophenols such as aminophenol, aminocresol, aminoresorcinol, and tyramine, and hydroxycarboxylic acids such as resorcylic acid, gallic acid, gentisic acid, 2,4,6-trihydroxybenzoic acid, hydroxyterephthalic acid, and norhemipinic acid.

Those active hydrogen compounds having less than three active hydrogen atoms capable of reacting with an epoxy group in their molecule are less susceptible to crosslinking reaction with the epoxy resin of component (a) and thus less effective in offset elimination.

Reaction of components (a) and (b) results in an epoxy resin which has a higher melt viscosity than epoxy resins of component (a) type having the same softening point as component (a). Despite its low softening point, the present epoxy resin is unsusceptible to offset.

Components (a) and (b) are reacted in such a proportion that about 0.05 to about 0.35 equivalents of active hydrogen in component (b) are present per equivalent of the epoxy group in component (a).

The epoxy resin resulting from reaction of components (a) and (b) may be modified into an epoxy-free binder resin by reacting an epoxy group of the resin with an active hydrogen compound such as monohydric phenols, secondary amines, and monofunctional carboxylic acids.

The epoxy resin of the present invention which consists of components (a) and (b) may be combined with a styrene-acryl resin, wax, olefinic oligomer resin or any other necessary agents such as charge control agents and thixotropic agents insofar as the advantages of the epoxy resin are not lost.

The epoxy resin of the present invention is useful as a binder resin for electrostatographic toner.

A toner may be prepared from the present epoxy resin by mixing the resin in powder form with other toner ingredients including a dye, pigment, charge control agent, and mold release agent, milling the mixture in an extruder or similar milling means, cooling the composition, and finely dividing the composition.

Examples of the pigment used herein include carbon black, Nigrosine, black iron oxide, metal complex salt dyes, chrome dye, Hansa Yellow, Benzidine Yellow, red oxide, Aniline Red, Prussian blue, ultramarine, and phthalocyanine blue. Examples of the charge control agent include benzyldimethyl hexadecylammonium chloride, tetrapentylammonium chloride, decyltrimethylammonium chloride, Nigrosine base, Nigrosine hydrochloride, Safranine, alkoxylated amines, alkyl azides, and ammonium sulfite. Examples of the wax include polyethylene, polypropylene, paraffin, microcrystalline wax, hydrogenated wax, carnauba wax, bees wax, polyoxyethylene, natural wax, amide wax, silicone, fluoroplastic, polyolefin, and stearic acid. Examples of the filler include hydrophobic silica, colloidal silica, polysulfone, fused quartz, ground glass, talc, clay, wallastonite, ground titanic acid, and ground fluoride although any known fillers may be used.

Exemplary methods of preparing the epoxy resin and the toner according to the present invention are described below although the present invention is not limited to these methods.

Reaction of components (a) and (b) is generally carried out in the presence of a catalyst and if desired, a solvent, at a temperature of about 50° to about 250° C., preferably about 100° to about 200° C.

If desired, a bisphenol and/or primary amine other than components (a) and (b) may be co-present with components (a) and (b) to effect reaction while extending the chain.

The bisphenols which may be co-present include those bisphenols which are illustrated as forming the bisphenol type epoxy resins of component (a).

Examples of the primary amines which may be co-present include (1) aliphatic primary amines such as propylamine, butylamine, hexylamine, octylamine, laurylamine, stearylamine, palmitylamine, and oleylamine; (2) aromatic primary amines such as aniline, toluidine, xylidine, cumidine, hexylaniline, nonylaniline, and dodecylaniline; (3) cycloaliphatic primary amines such as cyclopentylamine, cyclohexylamine, and norbornylamine; and (4) aromatic nuclearly substituted aliphatic primary amines such as benzylamine, phenetylamine, 4-pheny-3-methylbutylamine, and cinnamylamine.

Reaction of components (a) and (b) may also be carried out in a different way by reacting an epoxy resin of a lower molecular weight with a bisphenol to increase the molecular weight of the epoxy resin to the level of component (a) while component (b) is introduced so as to be co-present during the reaction.

The catalysts used herein include alkali metal hydroxides such as sodium hydroxide and lithium hydroxide; alkali metal alcolates such as sodium methylate; tertiary amines such as dimethylbenzylamine, triethylamine, and pyridine; quaternary ammonium salts such as tetramethylammonium chloride and benzyltrimethylammonium chloride; organic phosphorus compounds such as triphenylphosphine and triethylphosphine; quaternary phosphonium salts such as triphenylphosphine methyl iodide adduct; alkali metal salts such as sodium carbonate and lithium chloride; Lewis acids such as boron trifluoride, aluminum trichloride, and tin tetrachloride; and complexes such as boron trifluoridediethyl ether adduct. In general, the catalyst is present in an amount of about 0.01 to about 10,000 parts, preferably about 0.1 to about 1,000 parts by weight per million parts by weight (ppm) of component (a).

Solvent may be used in the reaction if desired. There may be used those solvents free of active hydrogen and ester group, for example, hydrocarbons such as toluene and xylene; and ketones such as methyl isobutyl ketone, methyl ethyl ketone, and cyclohexanone.

Electrostatographic toner is prepared from the present epoxy resin as the binder, for example, by processing the epoxy resin, a pigment (e.g., carbon black), a charge control agent, and a mold release agent into powders, and milling the ingredients in an extruder or similar milling means into a homogeneous mixture.

Next, the epoxy resin copolymer containing components (a) and (c) is described.

Component (a) is bisphenol type epoxy resins and hydrogenated bisphenol type epoxy resins which are the same as previously described.

Component (c) is an oligomer based on at least one main monomer selected from the class consisting of butadiene and isoprene and having on average at least 1.5 equivalents of active hydrogen capable of reacting with an epoxy group in its molecule. The active hydrogen groups which are contained in component (c) are carboxyl, phenolic hydroxyl, monofunctional or difunctional amino, and thiophenol groups, for example.

Examples of the oligomers used as component (c) are those oligomers which contain a carboxyl group or a monofunctional or difunctional amino group in an amount corresponding to at least 1.5 equivalents on average of active hydrogen, including butadiene polymers, butadienestyrene copolymers, butadieneacrylonitrile copolymers, isoprene polymers, isoprenestyrene copolymers, and isopreneacrylonitrile copolymers. Carboxyl-modified butadieneacrylonitrile copolymers are particularly preferred.

Components (a) and (c) are contained in such a proportion that about 5 to 40 parts by weight, preferably about 10 to about 35 parts by weight of component (c) is present per 100 parts by weight of component (a).

Oligomer (c) has a lower glass transition temperature than epoxy resin (a). Polymerizing oligomer (a) to epoxy resin (a) does not raise the softening pint of the resulting polymer (epoxy resin copolymer) or detract from the low-temperature fixing properties as the toner. The resulting epoxy resin copolymer having a higher molecular weight has a higher melt viscosity than the original epoxy resin (a) at the same temperature, and is thus less susceptible to offset.

The binder resin or epoxy resin copolymer of components (a) and (c) has a softening point of 60° to 130° C., preferably 70° to 130° C. as measured by Durran's method.

The epoxy resin copolymer resulting from reaction of components (a) and (c) may be modified into an epoxy-depleted binder resin by reacting an epoxy group of the copolymer with an active hydrogen compound such as monohydric phenols, secondary amines, and monofunctional carboxylic acids.

The binder resin for use in the toner of the present invention which consists of components (a) and (c) may be combined with a styrene-acryl resin, wax, or any other necessary agents such as charge control agents and thixotropic agents insofar as the advantages of the binder resin are not lost.

Toner ingredients other than the binder resin are not particularly limited, and their examples are previously described in conjunction with the first embodiment.

Reaction of components (a) and (c) is generally carried out in the presence of a catalyst and if desired, a solvent, at a temperature of about 50° to about 250° C., preferably about 100° to about 200° C.

If desired, a bisphenol and/or primary amine other than components (a) and (c) may be co-present with components (a) and (c) to effect reaction while extending the chain, as previously described in conjunction with the epoxy resin of components (a) and (b) in the first embodiment.

Reaction of components (a) and (c) may also be carried out in a different way by reacting an epoxy resin of a lower molecular weight with a bisphenol to increase the molecular weight of the epoxy resin to the level of component (a) while component (c) is introduced so as to be co-present during the reaction.

The catalyst and solvent which may be used herein are as previously described in conjunction with the epoxy resin of components (a) and (b) in the first embodiment.

A toner may be prepared from the binder resin of the second embodiment in the same manner as in the first embodiment.

Next, the epoxy resin resulting from reaction of components (a), (d), (e), and (f) is described.

Component (a) is bisphenol type epoxy resins and hydrogenated bisphenol type epoxy resins which are the same as previously described.

Component (d) is a bisphenol which may be selected from bisphenols commonly used in epoxy resins. Examples of the bisphenol and the mixture of bisphenols used herein are those previously described in conjunction with component (a).

Component (e) is at least one member selected from the class consisting of active hydrogen compounds and acid anhydrides having at least 3 equivalents of active hydrogen or acid anhydride group capable of reacting with an epoxy group in the molecule.

Among component (e), the active hydrogen compound having at least 3 equivalents of active hydrogen capable of reacting with an epoxy group in the molecule is a compound having at least three active hydrogen atoms capable of reacting with an epoxy group, as given by amino, carboxyl or phenolic hydroxyl groups. This is the same as component (b) previously described. Among those, meta-xylyene-diamine, aminophenol are preferred.

Another component (e) is an acid anhydride having at least 3 equivalents of acid anhydride group capable of reacting with an epoxy group in the molecule. THis acid anhydride is of the formula $(RCO)_2O$ resulting from condensation of two carboxyl groups of a polybasic acid with water lost. Examples of the acid anhydride used herein include phthalic anhydride, trimellitic anhydride, pyromellitic anhydride, benzophenonetetracarboxylic acid anhydride, ethyleneglycolbis(anhydrotrimellitate), glyceroltris(anhydrotrimellitate), maleic anhydride, succinic anhydride, tetrahydrophthalic anhydride, methyltetrahydrophthalic anhydride, methylnadic acid anhydride, alkenylsuccinic anhydride, hexahydrophthalic anhydride, methylhexahydrophthalic anhydride, methylcyclohexenetetracarboxylic anhydride, chlorendic anhydride, and tetrabromophthalic anhydride. Particularly preferred are methyltetrahydrophthalic anhydride and hexahydrophthalic anhydride.

Component (f) is an oligomer containing butadiene and/or isoprene as a main monomer and having on average at least 1.5 equivalents of active hydrogen and/or acid anhydride group capable of reacting with an epoxy group in its molecule. The active hydrogen or acid anhydride groups capable of reacting with an epoxy group are carboxyl, phenolic hydroxyl, monofunctional or difunctional amino, and acid anhydride groups, for example.

Examples of the oligomers used as component (f) are those oligomers which contain a carboxyl group or a monofunctional or difunctional amino group in an amount corresponding to at least 1.5 equivalents on average of active hydrogen, including butadiene polymers, butadienestyrene copolymers, butadieneacrylonitrile copolymers, isoprene polymers, isoprenestyrene copolymers, and isopreneacrylonitrile copolymers. They preferably have an average molecular weight of about 500 to 50,000. Carboxyl-modified butadiene-acrylonitrile copolymers are particularly preferred.

Components (d) and (e) are present in the epoxy resin in the amounts defined by the following equations (1) and (2):

$$400 \leq \frac{W(a) + W(d)}{W(a)/EqO(a) - W(d)/EqOH(d)} \leq 900 \quad (1)$$

and $$\alpha \geq \frac{\gamma \rho}{1 - \gamma(1 - \rho)} \quad (2)$$

wherein $$\alpha = \frac{1}{N(e) - 1}$$

$$\gamma = \frac{N(d) + N(e)}{N(a)}$$

$$\rho = \frac{N(e)}{N(d) + N(e)}, \text{ and}$$

wherein
W(a) and W(d) are the weight of components (a) and (d) respectively,
EqO(a) is an epoxy equivalent of component (a) and EqOH(d) is an OH equivalent of component (d).
N(a), N(d), and N(e) are the average functionality per molecule of components (a), (d), and (e), respectively.

Outside the above-defined ranges of components (d) and (e), the resulting epoxy resin is less desirable in crushability and softening point.

Component (f) is present in an amount of about 2 to about 30 parts by weight, preferably about 3 to about 9 parts by weight per 100 parts by weight of component (a). The presence of less than about 2 parts by weight of component (f) results in a low melt viscosity whereas more than about 30 parts by weight of component (f) adversely affects crushability.

The epoxy resin resulting from reaction of components (a), (d), (e), and (f) may be modified into an epoxy-depleted binder resin by reacting an epoxy group of the resin with an active hydrogen compound such as monohydric phenols, secondary amines, and monofunctional carboxylic acids.

The epoxy resin for use in the toner of the present invention which consists of components (a), (d), (e), and (f) may be combined with a styrene-acryl resin, olefinic oligomer resin, or any other necessary agents such as charge control agents and thixotropic agents insofar as the advantages of the epoxy resin are not lost.

Toner ingredients other than the binder resin, for example, pigments, dyes, and mold release agents are not particularly limited, and their examples are previously described in conjunction with the first embodiment.

Methods for preparing the epoxy resin and the toner according to the present invention are described below, although the present invention is not limited thereto.

Reaction is generally carried out by effecting polymerization of a (hydrogenated) bisphenol type epoxy resin having a low molecular weight or in liquid state in the copresence of (hydrogenated) bisphenol (d), active hydrogen compound and/or acid anhydride (e), and oligomer (f) for increasing the molecular weight of the epoxy resin through addition polymerization.

If necessary, a (hydrogenated) bisphenol type epoxy resin having a high molecular weight or in solid state is first prepared by carrying out reaction of a (hydrogenated) bisphenol type epoxy resin to increase the molecular weight thereof or by a separate synthesis process. Then the (hydrogenated) bisphenol type epoxy resin is reacted with component (e) and (f) at the same time or sequentially with one component and then with the other component.

Reaction of components (a), (d), (e), and (f) is generally carried out in the presence of a catalyst and if desired, a solvent, at a temperature of about 50° to about 250° C., preferably about 100° to about 200° C.

If desired, a bisphenol and/or primary amine other than components (a), (d), (e), and (f) may be co-present with components (a), (d), (e), and (f) to effect reaction while extending the chain, as previously described in conjunction with the epoxy resin of components (a) and (b) in the first embodiment.

The catalyst and solvent which may be used herein are as previously described in conjunction with the epoxy resin of components (a) and (b) in the first embodiment.

A toner may be prepared from the binder resin of the second embodiment in the same manner as in the first embodiment.

The toner of the present invention may be used in any electrostatography including electrostatographic copying machines and facsimile machines.

EXAMPLES

Examples of the present invention are given below by way of illustration and not by way of limitation.

EXAMPLE 1

Synthesis of resin

A 10-liter separable flask equipped with a thermometer and a stirrer was charged with 4,000 grams of a bisphenol-A type epoxy resin having an epoxy equivalent of 188 grams/equivalent, 1,127 grams of bisphenol-A, and 500 grams of xylene. The contents were heated to a temperature of 120° C. under nitrogen atmosphere.

To the contents was added 0.8 grams of triphenylphosphine in 50 grams of xylene as a catalyst.

The contents were heated to a temperature of 150° C while stripping off xylene under vacuum. At the end of xylene stripping, nitrogen atmosphere was restored in the flask interior. Reaction was carried out for 7 hours at 150° C., yielding an epoxy resin having an epoxy equivalent of 470 grams/equivalent and a softening point of 67° C. as measured by Durran's method.

Thereafter, 77 grams of meta-xylylenediamine was added to the epoxy resin before reaction was carried out for another 7 hours at 150° C. There was obtained an epoxy resin (I) having an epoxy equivalent of 610 grams/equivalent, a softening point of 85° C., and a melt index (MI @90° C.) of 9 grams/10 min. as measured according to JIS K-7210 at a temperature of 90° C and a load of 500 grams.

Preparation of toner

A mixture of 100 parts by weight of epoxy resin (I) prepared above, 2 parts by weight of Nigrosine dye N-04 (manufactured and sold by Orient Chemicals K.K.), 6 parts by weight of carbon black #30 (manufactured and sold by Mitsubishi Chemicals K.K.), and 9 parts by weight of a polyethylene wax having a viscosity average molecular weight of 1,000, a melting point of 109° C. as measured by the differential scanning calorimetry (DSC), a softening point of 113° C. as measured by the ring and ball test, and a melt viscosity of 20 centipoise at 140° C. was milled in a kneader. The milled mixture was cooled and finely ground into a toner having an average particle size of about 13 to 15 $\mu$m.

A developer was prepared by mixing 5 parts by weight of the toner with 95 parts by weight of iron powder carrier having an average particle size of about 60 to 100 $\mu$m.

Evaluation

An electrostatic latent image was formed by a conventional electrostatographic process and then developed using the above-prepared developer. The resulting toner image was transferred to a sheet of transfer paper, fixed thereto by means of a fixing roller surface coated with an RTV silicone rubber (manufactured by Shinetsu Chemicals K.K.), and evaluated for fixing and offset properties.

(1) Fixing

After fixing, the transfer paper was rubbed with a rubber eraser.

O good: more than 80% remained
Δ fair: 20–80% remained
X bad: less than 20% remained (2) Offset After fixing, the transfer paper was evaluated for offset property.

O: no offset
Δ: some offset
X: offset

Further, the transfer paper was allowed to stand for one week in close contact with a flexible polyvinyl chloride sheet at room temperature. Adherence of the toner to the polyvinyl chloride sheet was observed.

The results are shown in Table 1.

EXAMPLE 2

The procedure of Example 1 was repeated except that epoxy resin (I) was synthesized by admitting meta-xylylenediamine at the initial stage of reaction along with the bisphenol-A type epoxy resin and bisphenol-A and carrying out reaction for 7 hours at 150° C.

A toner was prepared and evaluated by the same procedures as in Example 1.

The results are shown in Table 1.

EXAMPLES 3-9

The procedure of Example 2 was repeated except that the meta-xylylenediamine was replaced by different amino compounds.

The results are shown in Tables 1.

COMPARATIVE EXAMPLE 2

It was attempted to synthesize epoxy resin (I) by following the procedure of Example 2 except that the amount of meta-xylylenediamine was increased to 270 grams. The reaction system gelled during reaction, rendering synthesis impossible.

TABLE 1

| Example | Active hydrogen compound Type | Amount (g) | Epoxy resin (I) Epoxy equivalent (g/eg.) | MI @ 90° C. (g/10 min) | Softening point (°C.) | Fixing (upper) and offset (lower) of toner at a fixing temperature (°C.) 70 | 80 | 85 | 90 | 95 | 100 | 110 | 175 | Adherence to flexible polyvinyl chloride |
|---|---|---|---|---|---|---|---|---|---|---|---|---|---|---|
| 1 | m-xylylene-diamine | 77 | 610 | 9 | 85 | X / Δ | Δ / O | O / O | O / O | O / O | O / O | O / O | O | NO |
| 2 | m-xylylene-diamine | 77 | 600 | 11 | 84 | Δ / O | O / O | O / O | O / O | O / O | O / O | O / O | O | NO |
| 3 | diaminodiphenyl-methane | 108 | 615 | 8 | 85 | X / Δ | Δ / O | O / O | O / O | O / O | O / O | O / O | O | NO |
| 4 | triethylene-tetramine | 53 | 605 | 16 | 80 | Δ / O | O / O | O / O | O / O | O / O | O / O | O / O | O | NO |
| 5 | isophorone-diamene | 93 | 610 | 10 | 85 | X / Δ | Δ / O | O / O | O / O | O / O | O / O | O / O | O | NO |
| 6 | P-hydroxy-aniline | 79 | 605 | 13 | 83 | X / Δ | O / O | O / O | O / O | O / O | O / O | O / O | O | NO |
| 7 | polyamine (1)* | 207 | 610 | 12 | 82 | Δ / O | O / O | O / O | O / O | O / O | O / O | O / O | O | NO |
| 8 | polyamideamine** | 218 | 615 | 15 | 80 | Δ / O | O / O | O / O | O / O | O / O | O / O | O / O | O | NO |
| 9 | sebasic acid dihydrazide | 125 | 620 | 21 | 79 | Δ / O | O / O | O / O | O / O | O / O | O / O | O / O | O | NO |
| 10 | trimellitic acid | 76 | 550 | 16 | 81 | Δ / Δ | O / O | O / O | O / O | O / O | O / O | O / O | O | NO |
| 11 | phenol novolak (OH equivalent = 103 g/eq., softening point = 97° C.) | 201 | 605 | 10 | 84 | X / X | X / Δ | O / O | O / O | O / O | O / O | O / O | O | NO |
| 12 | ortho-cresol novolak (OH equivalent = 118 g/eq., Softenig point = 79° C.) | 270 | 600 | 14 | 82 | X / Δ | Δ / O | O / O | O / O | O / O | O / O | O / O | O | NO |
| 13 | octylphenol novolak (OH equivalent = 225 g/eq., Softenig point = 99° C.) | 354 | 610 | 24 | 76 | Δ / O | O / O | O / O | O / O | O / O | O / O | O / O | O | NO |
| CE 1 | — | — | 470 | ≧30 | 67 | O / X | O / X | O / X | O / X | O / X | O / X | O / X | O / X | NO |

*polyamine (1): modified cycloaliphatic polyamine, active hydrogen equivalent 95, η = 2611-3400 cps at 25° C.
**polyamideamine: active hydrogen equivalent 100, η = 2000-6000 cps at 40° C.

EXAMPLE 10

The procedure of Example 2 was repeated except that the meta-xylylenediamine was replaced by 76 grams of trimellitic acid and the xylylene was replaced by acetone.

The results are shown in Table 1.

EXAMPLES 11-13

The procedure of Example 10 was repeated except that the trimellitic acid was replaced by different polyhydric phenols.

The results are shown in Table 1.

COMPARATIVE EXAMPLE 1

The procedure of Example 1 was repeated except that a toner was prepared from the epoxy resin obtained before the addition of meta-xylylenediamine.

The results are shown in Table 3.

EXAMPLE 14

Synthesis of resin

A 10-liter separable flask equipped with a thermometer and a stirrer was charged with 4,000 grams of a bisphenol-A type epoxy resin having an epoxy equivalent of 188 grams/equivalent, 1,322 grams of bisphenol-A, and 500 grams of xylene. The contents were heated to a temperature of 120° C. under nitrogen atmosphere.

To the contents was added 0.8 grams of triphenylphosphine in 50 grams of xylene as a catalyst.

The contents were heated to a temperature of 150° C. while stripping off xylene under vacuum. At the end of xylene stripping, nitrogen atmosphere was restored in the flask interior. Reaction was carried out for 7 hours at 150° C., yielding an epoxy resin having an epoxy equivalent of 580 grams/equivalent and a softening point of 78° C. as measured by Durran's method.

Thereafter, 1597 grams of a carboxyl-terminated butadiene-acrylonitrile copolymer having on average 1.5 to 2.0 equivalents of active hydrogen in the molecule (manufactured and sold by Ube Kosan K.K. under the trade name of Hiker CTBN 1300×13) was added to the epoxy resin before reaction was carried out for another 7 hours at 150° C. There was obtained an epoxy resin (II) in the form of a copolymer having an epoxy equivalent of 820 grams/equivalent and a softening point of 80° C.

Preparation of toner

A mixture of 100 parts by weight of epoxy resin (II) prepared above, 2 parts by weight of Nigrosine dye N-04 (manufactured and sold by Orient Chemicals K.K.), 6 parts by weight of carbon black #30 (manufactured and sold by Mitsubishi Chemicals K.K.), and 9 parts by weight of a polyethylene wax having a viscosity average oelcular weight of 1,000, a melting point of 10920 C. as measured by DSC method, a softening point of 113° C. as measured by the ring and ball test, and a melt viscosity of 20 centipoise at 140° C. was milled in a kneader. The milled mixture was cooled and finely ground into a toner having an average particle size of about 13 to 15 μm.

A developer was prepared by mixing 5 parts by weight of the toner with 95 parts by weight of iron powder carrier having an average particle size of about 60 to 100 μm.

Evaluation was carried out by the same procedures as in Example 1.

The results are shown in Table 4.

EXAMPLE 15

The procedure of Example 14 was repeated except that epoxy resin (II) was synthesized by admitting the carboxyl-terminated butadiene-acrylonitrile copolymer at the initial stage of reaction along with the bisphenol-A type epoxy resin and bisphenol-A and carrying out reaction for 7 hours at 150° C.

A toner was prepared and evaluated by the same procedures as in Example 14.

The results are shown in Table 2.

EXAMPLE 16

The procedure of Example 15 was repeated except that the carboxyl-terminated butadiene-acrylonitrile copolymer was replaced by 1597 grams of an amino-terminated butadieneacrylonitrile copolymer having on average 3.5 to 4 equivalents of active hydrogen in the molecule (manufactured and sold by Ube Kosan K.K. under the trade name of Hiker ATBN 1300×16).

The results are shown in Table 2.

EXAMPLE 17

The procedure of Example 15 was repeated except that the carboxyl-terminated butadiene-acrylonitrile copolymer was replaced by 1597 grams of a garboxyl-terminated butadiene oligomer having on average 2.0 equivalents of active hydrogen in the molecule (manufactured and sold by Ube Kosan K.K. under the trade name of CTB 2000×162).

The results are shown in Table 2.

COMPARATIVE EXAMPLE 3

The procedure of Example 14 was repeated except that a toner was prepared from the epoxy resin obtained before the addition of carboxyl-terminated butadiene-acrylonitrile copolymer.

The results are shown in Table 2.

COMPARATIVE EXAMPLE 4

The procedure of Example 15 was repeated except that the amount of carboxyl-terminated butadiene-acrylonitrile copolymer was changed to 50 parts by weight per 100 parts by weight of the starting epoxy resin. The resulting mixture of the epoxy resin and the remaining toner ingredients was difficult to comminute into a toner powder.

TABLE 2

| | Binder resin | | Fixing (upper) and offset (lower) of toner at a fixing temperature (°C.) | | | | | | | Adherence to flexible polyvinyl chloride |
|---|---|---|---|---|---|---|---|---|---|---|
| Example | Epoxy equivalent (g/eq.) | Softening point (°C.) | 80 | 85 | 90 | 95 | 100 | 110 | 175 | |
| 14 | 820 | 80 | Δ | O | O | O | O | O | O | NO |
| | | | O | O | O | O | O | O | O | |
| 15 | 815 | 78 | O | O | O | O | O | O | O | NO |
| | | | O | O | O | O | O | O | O | |
| 16 | 805 | 77 | O | O | O | O | O | O | O | NO |
| | | | O | O | O | O | O | O | O | |
| 17 | 835 | 78 | Δ | O | O | O | O | O | O | NO |
| | | | O | O | O | O | O | O | O | |
| CE 3 | 580 | 78 | Δ | O | O | O | O | O | O | NO |
| | | | X | X | X | X | X | X | X | |

EXAMPLE 18

Synthesis of resin

A 10-liter separable flask equipped with a thermometer and a stirrer was charged with 4,000 grams of a bisphenol-A type epoxy resin having an epoxy equivalent of 188 grams/equivalent, 1,160 grams of bisphenol-A, 166.6 grams of an ortho-cresol novolak resin having a softening point of 79° C. and an OH equivalent of 118 grams/equivalent, 380 grams of a carboxyl-terminated butadiene-acrylonitrile copolymer having on average 1750 grams/equivalent of active hydrogen in the molecule (manufactured and sold by Ube Kosan K.K. under the trade name of Hiker CTBN 1300×13), and 500 grams of xylene. The contents were heated to a temperature of 120° C. under nitrogen atmosphere.

To the contents was added 0.9 grams of triphenylphosphine in 50 grams of xylene as a catalyst.

The contents were heated to a temperature of 150° C. while stripping off xylene under vacuum. At the end of xylene stripping, nitrogen atmosphere was restored in the flask interior. Reaction was carried out for 7 hours at 150° C., yielding an epoxy resin (III) having a softening point of 82° C. as measured by Durran's method and a melt index (MI @90° C.) of 10 grams/10 min. as measured according to JIS K-7210 at a temperature of 90° C. and a load of 500 grams.

Preparation of toner

A mixture of 100 parts by weight of epoxy resin (III) prepared above, 2 parts by weight of Nigrosine dye N-04 (manufactured and sold by Orient Chemicals K.K.), 6 parts by weight of carbon black #30 (manufactured and sold by Mitsubishi Chemicals K.K.), and 9 parts by weight of a polyethylene wax having a viscosity average molecular weight of 1,000, a melting point of 109° C. as measured by DSC method, a softening point of 113° C. as measured by the ring and ball test, and a melt viscosity of 20 centipoise at 140° C. was milled in a kneader. The milled mixture was cooled and finely ground in a turbo-pulverlizer into a toner having an average particle size of about 13 to 15 μm.

A developer was prepared by mixing 5 parts by weight of the toner with 95 parts by weight of iron powder carrier having an average particle size of about 60 to 100 μm.

Evaluation

In turbo-grinding of the toner, the amounts of the mixture charged and the particles yielded were measured. The mixture from which more than 30% by weight of the charge was left in the pulverlizer because of short grinding is regarded as being poor in crushability.

Evaluation of fixing and offset was carried out by the same procedures as in Example 1.

The results are shown in Table 3.

EXAMPLE 19

The procedure of Example 18 was repeated except that 122.2 grams of ortho-cresol novolack resin and 502 grams of carboxyl-terminated butadiene-acrylonitrile copolymer were used.

A toner was prepared and evaluated by the same procedures as in Example 18.

The results are shown in Table 3.

EXAMPLE 20

The procedure of Example 18 was repeated except that the ortho-cresol novolack resin was replaced by 109 grams of a phenolic novolak resin having an OH equivalent of 103 grams/equivalent, and 365 grams of the carboxyl-terminated butadiene-acrylonitrile copolymer was used.

The results are shown in Table 3.

EXAMPLE 21

The procedure of Example 18 was repeated except that the ortho-cresol novolack resin was replaced by 199 grams of an octylphenol novolak resin having an OH equivalent of 225 grams/equivalent, and 383 grams of the carboxyl-terminated butadiene-acrylonitrile copolymer was used.

The results are shown in Table 3.

TABLE 3

| Example | Binder resin | | | Fixing (upper) and offset (lower) of toner at a fixing temperature (°C.) | | | | | | | | Crushability | Adherence to flexible polyvinyl chloride |
| --- | --- | --- | --- | --- | --- | --- | --- | --- | --- | --- | --- | --- | --- |
| | Epoxy equivalent (g/eq.) | Viscosity at 110° C. (poise) | Softening point (°C.) | 70 | 80 | 85 | 90 | 95 | 100 | 110 | 175 | | |
| 18 | 640 | 350 | 82 | X | X | Δ | O | O | O | O | O | Good | NO |
|  |  |  |  | X | X | O | O | O | O | O | X |  |  |
| 19 | 631 | 460 | 78 | X | Δ | O | O | O | O | O | O | Good | NO |
|  |  |  |  | X | Δ | O | O | O | O | O | X |  |  |
| 20 | 622 | 720 | 84 | X | X | X | O | O | O | O | O | Good | NO |
|  |  |  |  | X | X | Δ | O | O | O | O | X |  |  |
| 21 | 625 | 340 | 79 | X | Δ | O | O | O | O | O | O | Good | NO |
|  |  |  |  | X | O | O | O | O | O | O | X |  |  |

EXAMPLE 22

A 5-liter separable flask equipped with a thermometer type epoxy resin having an epoxy equivalent of 188 grams/equivalent, 538.1 grams of bisphenol-A, 112 grams of a phenolic novolak- resin having a softening point of 97° C. and an OH equivalent of 103 grams/equivalent, 189.8 grams of a carboxyl-terminated butadiene-acrylonitrile copolymer(manufactured and sold by Ube Kosan K.K. under the trade name of Hiker CTBN 1300×13), and 300 grams of xylene. The contents were heated to a temperature of 90° C. under nitrogen atmosphere.

To the contents was added 0.4 grams of triphenylphosphine in 20 grams of xylene as a catalyst.

The contents were heated to a temperature of 150° C. while stripping off xylene under vacuum. At the end of xylene stripping, nitrogen atmosphere was restored in the flask interior. Reaction was carried out for 5 hours, yielding an epoxy resin (IV) having a softening point of 99.8° C. as measured by Durran's method and a melt viscosity of 3550 ps at 110° C.

A toner was prepared and evaluated by the same procedures as in Example 18.

The results are shown in Table 4.

EXAMPLE 23

The procedure of Example 22 was repeated except that 700.9 grams of bisphenol-A, 45.3 grams of phenolic novolack resin and 341.4 grams of carboxyl-terminated butadieneacrylonitrile copolymer were used.

A toner was prepared and evaluated by the same procedures as in Example 18.

The results are shown in Table 4.

EXAMPLE 24

The procedure of Example 22 was repeated except that the phenolic novolack resin was replaced by 31.9 grams of meta-xylylene diamine and 611.3 grams of bisphenol-A, and 328.5 grams of the carboxyl-terminated butadieneacrylonitrile copolymer was used.

The results are shown in Table 4.

EXAMPLE 25

The procedure of Example 22 was repeated except that the phenolic novolack resin was replaced by 44.9 grams of meta-aminophenol, and 579.3 grams of bisphenol-A, and 325.5 grams of the carboxyl-terminated butadiene-acrylonitrile copolymer was used.

The results are shown in Table 4.

EXAMPLE 26

A 5-liter separable flask equipped with a thermometer and a stirrer was charged with 1,880 grams of a bisphenol-A type epoxy resin having an epoxy equivalent of 188 grams/equivalent, 700.9 grams of bisphenol-A, 330.0 grams of a carboxyl-terminated butadiene-acrylonitrile copolymer (manufactured and sold by Ube Kosan K.K. under the trade name of Hiker CTBN 1300×13), and 300 grams of xylene. The contents were heated to a temperature of 90° C. under nitrogen atmosphere.

To the contents was added 0.4 grams of triphenylphosphine in 20 grams of xylene as a catalyst.

The contents were heated to a temperature of 150° C. while stripping off xylene under vacuum. After stirring for 1 hour under vacuum of 7 mm Hg, nitrogen atmosphere was restored in the flask interior, and 30.4 g of meta-xylylene diamine was added under air cooling. Reaction was carried out for 4 hours at 150° C., yielding an epoxy resin (V) having a softening point of 102° C. as measured by Durran's method.

A toner was prepared and evaluated by the same procedures as in Example 18.

The results are shown in Table 4.

COMPARATIVE EXAMPLE 5

The procedure of Example 22 was repeated except that an epoxy resin having a softening point of 98° C. as measured by Durran's method was prepared from 1,880 grams of a bisphenol-A type epoxy resin having an epoxy equivalent of 188 grams/ equivalent and 782 grams of bisphenol-A.

The results are shown in Table 4.

COMPARATIVE EXAMPLE 6

The procedure of Example 22 was repeated except that an epoxy resin was prepared from 1,B80 grams of a bisphenol-A type epoxy resin having an epoxy equivalent of 188 grams/equivalent and 782 grams of bisphenol-A, and 799 grams of the carboxyl-terminated butadiene-acrylonitrile copolymer, and 0.6 grams of triphenyl phosphin was used.

The following procedures were the same as in Example 22, yielding an epoxy resin having a softening point of 102° C. as measured by Durran's method.

The resulting toner was similarly evaluated. The results are shown in Table 4.

As seen from the data, the toner-forming epoxy resin of the present invention is an effective binder resin for a toner for use in electrostatographic image development. The toner has the advantages that it can be fixed through a heat roll at relatively low temperatures without inviting offset, that crushability and shelf stability are excellent as it is free of blocking during shelf storage, and that the toner transferred to paper does not migrate to flexible polyvinyl chloride.

Obviously many modifications and variations of the present invention are possible in the light of the above teachings. It is therefore to be understood that within the scope of the appended claims the invention may be practiced otherwise than as specifically described.

What we claim:

1. An epoxy resin having a softening point of 60 to 130° C. as measured by Durran's method, which is prepared by reacting:
   (a) 100 parts by weight of at least one epoxy resin selected from the group consisting of bisphenol and hydrogenated bisphenol epoxy resins;
   (b) an active hydrogen compound having at least three active hydrogen atoms capable of reacting with an epoxy group in its molecule in an amount of about 0.05 to about 0.35 equivalent of active hydrogen per equivalent of epoxy group in (a), said amount being capable of partially curing the epoxy group of said component (a); and
   (c) about 5 to 40 parts by weight of an oligomer based on at least one main monomer selected from the group consisting of butadiene and isoprene, said oligomer having on average at least 1.5 equivalents of active hydrogen capable of reacting with an epoxy group in its molecule wherein components (b) and (c) are not identical.

2. An epoxy resin which is prepared by reacting
   (a) 100 parts by weight of at least one epoxy resin selected from the class consisting of bisphenol and hydrogenated bisphenol epoxy resins,
   (d) a bisphenol,
   (e) at least one member selected from the class consisting of active hydrogen compounds and acid anhydrides having at least 3 equivalents of active hydrogen or acid anhydride group capable of reacting with an epoxy group in the molecule, and
   (f) about 2 to about 30 parts by weight of an oligomer based on at least one main monomer selected from the class consisting of butadiene and isoprene, said oligomer having on average at least 1.5 equivalents of

TABLE 4

| | Binder resin | | | Toner | | | | | | | | |
|---|---|---|---|---|---|---|---|---|---|---|---|---|
| | Softening point | Epoxy equivalent | Viscosity at 110° C. | Fixing (upper) and offset (lower) of toner at a fixing temperature (°C.) | | | | | | | Crushability | Adherence to polyvinyl chloride |
| Example | (°C.) | (g/eq.) | (poise) | 100 | 110 | 115 | 120 | 130 | 140 | 175 | | |
| 22 | 99.8 | 948 | 3550 | X | O | O | O | O | O | O | Good | NO |
| | | | | X | O | O | O | O | Δ | X | | |
| 23 | 102 | 961 | 3820 | X | O | O | O | O | O | O | Good | NO |
| | | | | X | O | O | O | O | O | X | | |
| 24 | 103 | 842 | 4200 | X | O | O | O | O | O | O | Good | NO |
| | | | | X | O | O | O | O | O | O | | |
| 25 | 101 | 865 | 4160 | X | O | O | O | O | O | O | Good | NO |
| | | | | X | O | O | O | O | O | O | | |
| 26 | 102 | 909 | 4170 | X | O | O | O | O | O | O | Good | NO |
| | | | | X | O | O | O | O | O | O | | |
| CE 5 | 98 | 918 | 980 | Δ | O | O | O | O | O | O | Good | NO |
| | | | | Δ | Δ | X | X | X | X | X | | |
| CE 6 | 102 | 1320 | 4230 | X | O | O | O | O | O | O | Poor | NO |
| | | | | X | O | O | O | O | O | O | | | active hydrogen and/or acid anhydride group capable of reacting with an epoxy group in its molecule, the amounts of components (d) and (e) being defined by the equations:

$$400 \leq \frac{W(a) + W(d)}{W(a)/EqO(a) - W(d)/EqOH(d)} \leq 900 \quad (1)$$

and $$\alpha \geq \frac{\gamma\rho}{1 - \gamma(1 - \rho)} \quad (2)$$

wherein $$\alpha = \frac{1}{N(e) - 1}$$

$$\gamma = \frac{N(d) + N(e)}{N(a)}$$

$$\rho = \frac{N(e)}{N(d) + N(e)}, \text{ and}$$

wherein
W(a) and W(d) are the weight of components (a) and (d) respectively,
EqO(a) is an epoxy equivalent of component (a), and EqOH(d) is an OH equivalent of component (d).
N(a), N(d), and N(e) are the average functionality per molecule of components (a), (d), and (e), respectively wherein components (d), (e) and (f) are not identical.

* * * * *